June 1, 1971     T. J. STOLKI     3,582,447
COMPOSITE HONEYCOMB STRUCTURE
Filed May 23, 1969
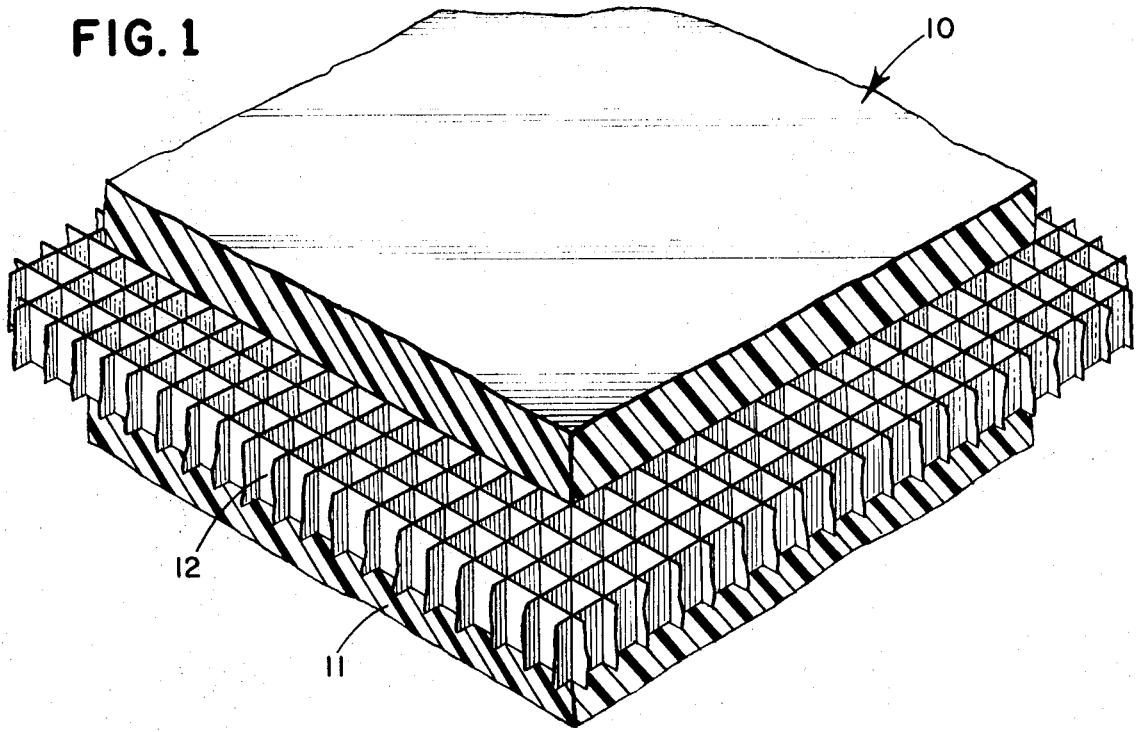
FIG. 1
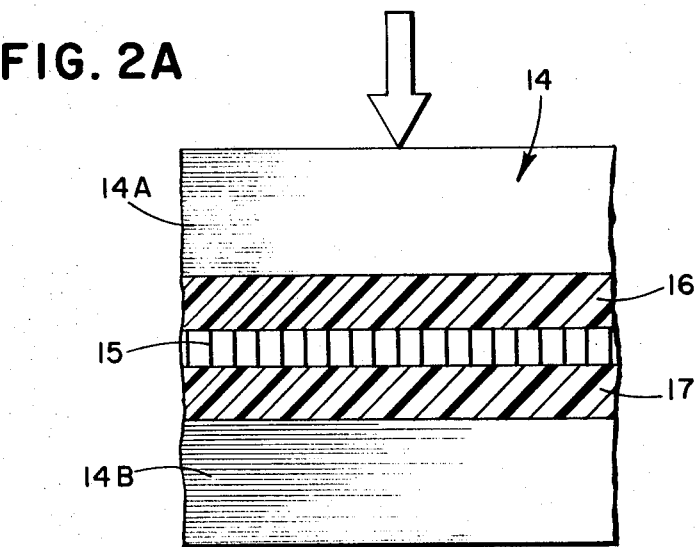
FIG. 2A
FIG. 2B
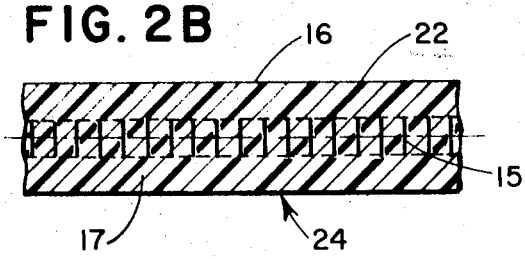
INVENTOR
THOMAS J. STOLKI
BY    JOHN W. KLOOSTER,
ARTHUR E. HOFFMAN,
RUSSELL H. SCHLATTMAN
ATTORNEYS United States Patent Office 3,582,447
Patented June 1, 1971

3,582,447
COMPOSITE HONEYCOMB STRUCTURE
Thomas J. Stolki, Wilbraham, Mass., assignor to
Monsanto Company, St. Louis, Mo.
Filed May 23, 1969, Ser. No. 827,393
Int. Cl. B32b 3/12
U.S. Cl. 161—68                           5 Claims

ABSTRACT OF THE DISCLOSURE

Composites which utilize a matrix layer of a rubber-modified interpolymer system of monovinyl aromatic compound in which is embedded an interlayer having a honeycomb structure and composed of metal or rigid organic polymeric material. The composites display improved heat resistance, structural integrity, and rigidity compared to the matrix layer alone, and are generally lighter in weight than all metallic panels of similar dimensions.

BACKGROUND

In the art of plastics, there has been a long felt need for plastic sheet-like composites which are heat resistant and have structural integrity and rigidity. As used throughout this document, the terms "heat resistant" and/or "heat resistance" have reference to the fact that a composite has the capacity to resist deformation at elevated temperatures (e.g. at temperatures of about 200° F. or even higher).

Similarly, as used throughout this document, the term "structural integrity and rigidity" has reference to the fact that a composite has a combination of relatively high tensile strength, relatively high tensile modulus of elasticity, and relatively low flexibility, compared, for example, to a matrix layer by itself. Few inorganic or organic structural materials are available having such a combination of properties.

Although rubber-modified interpolymer systems of monovinyl aromatic compounds are known to have many favorable physical characteristics, such polymer systems in sheet-like form have average to mediocre heat resistance and structural integrity and rigidity properties. Ways to improve these properties to make these interpolymer systems better able to supply the long felt need for higher performance materials as noted above have been rather difficult to develop.

There has now been discovered, however, a sheet-like composite which utilizes such interpolymer systems as the continuous portion and which utilizes as a discontinuous portion embedded therein honeycomb structures. The product composites have generally unexpected and superior heat resistance and structural integrity and rigidity characteristics. The product composites are generally lighter in weight than solid metal panels of corresponding dimensions, and are useful in structural applications in place of all metal structures.

SUMMARY

This invention is directed to sheet-like composites which are heat resistant and have structural integrity and rigidity. These composites utilize at least one matrix layer and at least one interlayer which is positioned with each matrix layer.

Each matrix layer is composed of semi-rigid, solid plastic and has spaced, generally parallel opposed faces. Each such layer has an average transverse thickness ranging from about .015 to 0.5 inch, a tensile modulus of elasticity of from about 150,000 to 600,000 lbs./in.$^2$ at 73° F., a tensile elongation to fail of at least about 5 percent at 73° F., a flexural modulus of from about 100,000 to 500,000 p.s.i., a flexural strength of from about 2000 to 15,000 p.s.i., and an impact strength of from about 15 to 100 ft.-lbs. falling dart (measured at 0.1 inch thickness and 73° F.), all such values, of course, being characteristic of the whole layer itself independently. Each matrix layer is in a sheet-like form and comprises an interpolymer system of monovinyl aromatic compound and alpha-electronegatively substituted ethene compound, as described hereinafter.

Each interlayer is composed of metal or of rigid organic polymeric material and likewise has spaced generally parallel opposed faces. The interlayer has a transverse average thickness ranging from about 5 to 85 percent of the total transverse average thickness of the matrix layer, preferably a flexural modulus or a flexural strength (preferably both) at least equal to that of the matrix layer, all such values, of course, being characteristic of the whole layer itself independently.

Each interlayer is in a sheet-like form and is composed of continuous, generally cross-sectionally elongated solid material portions arranged into a honeycomb structure having a generally regular and recurring geometric pattern of solid material portions and open spaces. The open spaces between solid portions are systematically positioned across the interlayer relative to a face thereof. The preferred relationship between the solid portions and the open space is such that from about 0.5 to 70 percent of the total average cross-sectional area of the interlayer comprises solid material. The cross-sectionally elongated solid portions have a width to height ratio which is less than 1 (width being measured parallel to a face of an interlayer and height being measured normally to such face) and which is preferably less than 0.5. As respects a given interlayer, the average width to height ratio is generally uniform throughout that interlayer, as is the transverse average thickness thereof. An interlayer is positioned substantially completely within a matrix layer and is generally co-extensive therewith (except possibly at extreme edge regions).

This invention is also directed to methods for making such composites.

For purposes of this invention, the term "sheet-like" has reference to sheets, films, tubes, extrusion profiles, discs, cones, and the like, all generally having wall thickness corresponding to the thickness of the matrix layer. Those skilled in the art will appreciate that under certain circumstances, three dimensional sheet-like composites of the invention may, without departing from the spirit and scope of this invention, in effect be filled with some material. In general, a sheet-like composite of the invention is self-supporting, that is, it exists in air at room conditions without the need for a separate solid supporting member in face-to-face engagement therewith in order to maintain the structural integrity thereof without composite deterioration (as through splitting, cracking, or the like).

For purposes of this invention, tensile modulus of elasticity, tensile elongation to fail, flexural modulus, flexural strengths, and the like, are each conveniently measured (using ASTM Test Procedures or equivalent).

A suitable falling dart impact strength measurement test procedure is as follows: A falling dart drop testing apparatus like that described in ASTM D–1709–59T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. The test specimen is clamped and held firmly between steel annular rings with an inside diameter of 5 inches. The clamping mechanism is aligned so that the dart strikes the center of the test specimen. The test specimens are preferably 6 inch by 6 inch flat plastic sheets. Specimen thicknesses should not deviate more than 5 percent from the nominal or average thickness. In a test, the specimen is placed in the clamping mechanism, and the dart is loaded with the weight at which 50 percent failure is expected. Then, the test specimen is impacted with the dart and examined for cracks (failure is designated by any crack in the specimen). A new specimen is used for each impact. In the event that the specimen fails (or does not fail), one decreases (or increases) the weight in increments of 0.25 pound until the procedure produces a failure-non-failure (or non-failure-failure) sequence. The results are recorded and the test is preferably continued until at least 15 speciments have been thus tested.

The calculation procedure is as follows:

(A) Record the number of impacts tested after the failure-non-failure (or non-failure-failure) point is reached (N), (B) Add together the dart weights for the N impacts (W), (C) Divide W by N ($W_{50}$), (D) Multiply $W_{50}$ by the drop height (26″) to obtain the 50 percent fail falling dart impact ($F_{50}$).

To determine falling dart impact for composites of this invention, the following modified procedure may be used. The same dart drop testing apparatus as above is used, except that the dart has a one-inch diameter hemispherical head and the test specimen is not clamped, but is placed on a flat, hard annular surface. Test specimens are preferably 4 inch by 4 inch flat composites. The procedure and calculations are described as above.

Starting materials—matrix layer

In general, any semi-rigid solid plastic having the characteristics above described can be used as a matrix layer in a composite of this invention, as indicated above. As used herein, the terminology "rubber modified interpolymer system of monovinyl aromatic compound" has reference to:

(A) A graft copolymer produced by polymerizing monovinyl aromatic compound in the presence of a preformed elastomer, and mixtures of such;

(B) A graft copolymer produced by polymerizing monovinyl aromatic compound and at least one other monomer polymerizable therewith in the presence of a preformed elastomer, and mixtures of such; and (C) A mechanical mixture of (A) or (B) with either monovinyl aromatic compound polymer, or a copolymer of monomvinyl aromatic compound and at least one other monomer polymerizable therewith, or both, and mixtures of such.

As used herein, the term "monovinyl aromatic compound" has reference to styrene (preferred); alkyl-substituted styrenes, such as ortho-, meta-, and para-methyl styrenes, 2,4-dimethylstyrene, paraethylstyrene, p-t-butyl styrene, alpha-methyl styrene, alpha-methyl-p-methyl-styrene, or the like; halogen substituted styrenes, such as ortho-, meta-, and para-chlorostyrenes, or bromostyrenes, 2,4-dichlorostyrene, or the like; mixed halo-alkyl-substituted styrenes, such as 2-methyl-4-chlorostyrene, and the like; vinyl naphthalenes; vinyl anthracenes; mixtures thereof; and the like. The alkyl substituents generally have less than five carbon atoms per molecule, and may include isopropyl and isobutyl groups.

In general, such an interpolymer system has a number average molecular weight ($\overline{M}_n$) ranging from about 20,000 through 120,000, and the ratio of weight average molecular weight ($\overline{M}_w$) to number average molecular weight $\overline{M}_w/\overline{M}_n$ ranging from about 2 through 10.

In general, suitable elastomers for use in this invention can be saturated or unsaturated, and have a glass phase or second order transition temperature below about 0° C. (preferably below about −25° C.), as determined, for example, by ASTM Test D–746–52T, and have a Young's Modulus of less than about 40,000 p.s.i. Examples of suitable elastomers include unsaturated elastomers such as homopolymers or copolymers of conjugated alkadienes (such as butadiene or isoprene), where, in such copolymers, at least 50 percent thereof is the conjugated alkadiene; ethylene/propylene copolymers, neoprene, butyl elastomers, and the like; and saturated elastomers such as polyurethane, silicone rubbers, acrylic rubbers, halogenated polyolefins, and the like.

A preferred class of elastomers for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene/acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile; alkyl acrylates (e.g. methyl acrylate, butyl acrylate, 2-ethylhexyl acrylate, etc.); the corresponding alkyl methacrylates, acrylamides (e.g. acrylamide, methacrylamide, N-butyl acrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A more preferred group of diene polymer elastomers are those consisting essentially of 75.0 to 100.0 percent by weight of butadiene and/or isoprene and up to 25.0 percent by weight of a monomer selected from the group consisting of monovinyl aromatic compounds and unsaturated nitriles (e.g. acrylonitrile), or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Another preferred class of rubbers for use in this invention are acrylic rubbers. Such a rubber may be formed from a polymerizable monomer mixture containing at least 40 weight percent of at least one acrylic monomer of the formula:

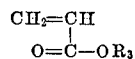

where $R_3$ is a radical of the formula:

$(C_pH_{2p+1})$ and $p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinyl-benzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

One preferred class of monomers for copolymerizing with monovinyl aromatic compounds to produce interpolymer systems suitable for use in this invention as indicated above are alpha-electronegatively substituted ethenes. Suitable such monomers are represented by the generic formula:

(2)

where

X is selected from the group consisting of —CN,
—COOR$_2$
and —CONHR$_2$,
R$_1$ is selected from the group consisting of hydrogen, —(C$_n$H$_{2n+1}$), —(C$_n$H$_{2n}$)—CN, and
—(C$_n$H$_{2n}$)—COOR$_2$
R$_2$ is selected from the group consisting of hydrogen, and —(C$_m$H$_{2m+1}$),
n is an integer of from 1 through 4, and
m is an integer of from 1 through 8.

Suitable ethene nitrile compounds of Formula 2 are especially preferred and include acrylonitrile (preferred), methacrylonitrile, ethacrylonitrile, 2,4-dicyanobutene-1, mixtures thereof, and the like.

Suitable acrylic compounds of Formula 2 are especially preferred and include unsaturated acids such as acrylic acid and methacrylic acid; 2,4-dicarboxylic acid butene-1, unsaturated esters, such as alkyl acrylates (e.g. methyl acrylates, ethyl acrylate, butyl acrylate, octyl acrylate, etc.), and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Another preferred class of monomers for copolymerizing with monovinyl aromatic compounds as indicated above conjugated alkadiene monomers. Suitable such monomers include butadiene, 3-methyl-1,3-butadiene, 2-methyl-1,3-butadiene, piperylene chloroprene, mixtures thereof and the like. Conjugated 1,3-alkadienes are especially preferred.

Another preferred class of monomers for copolymerizing with monovinyl aromatic compounds as indicated above are unsaturated esters of dicarboxylic acids, such as dialkyl maleates, or fumarates and the like.

Considered as a whole, "other monomer polymerizable" with a monovinyl aromatic compound is commonly and preferably an ethylenically-unsaturated monomer.

Optionally, a polymerization of monovinyl aromatic compound with at least one other monomer polymerizable therewith may be conducted in the presence of up to about 2 weight percent (based on total product polymer weight) of a crosslinking agent such as a divinyl aromatic compound, such as divinyl benzene, or the like. Also optionally, such an interpolymer system may have chemically incorporated thereinto (as through polymerization) a small quantity, say, less than about 2 weight percent (based on total polymer weight) of a chain transfer agent, such as an unsaturated terpene (like terpinolene), an aliphatic mercaptan, a halogenated hydrocarbon, an alpha-methylstyrene dimer, or the like.

In any given rubber-modified interpolymer system of monovinyl aromatic compound used in this invention, there is typically present from about 50 to 93 weight percent of chemically combined monovinyl aromatic compound, from about 5 to 48 weight percent of chemically combined other monomer polymerizable therewith and from about 2 to 45 weight percent elastomer, based on total interpolymer system weight. Preferably, in such a system, there are from 58 to 74 weight percent monovinyl aromatic compound; 14 to 31 weight percent other monomer polymerizable therewith, and from about 5 to 30 weight percent elastomer (same basis). Of course, any given matrix of such a system is chosen so as to have physical characteristics as above indicated. In the case of graft copolymers, and in the case of copolymers of monovinyl aromatic compound and at least one other monomer polymerizable therewith, preferably, the amount of chemically combined monovinyl aromatic compound ranges from about 50 to 85 weight percent and the amount of other monomer polymerizable therewith ranges from about 25 to 15 percent.

Preferred rubber modified interpolymer systems of monovinyl aromatic compounds are graft copolymers of Type (B) above. More preferred such graft copolymers are those of monovinyl aromatic compound and alpha-electronegatively substituted ethene grafted onto preformed elastomer substrate, such as polybutadiene; in such a polymer system, the amount of monovinyl aromatic compound typically ranges from about 20 to 95 weight percent (preferably from about 50 to 75 weight percent) while, correspondingly, the amount of chemically combined alpha-electronegatively substituted ethene ranges from about 80 to 5 percent (preferably from about 10 to 25 weight percent). In addition, the amount of chemically combined conjugated alkadiene monomer typically ranges up to about 25 weight percent and preferably from about 5 to 20 weight percent. Such a graft copolymer blend usually has a specific viscosity of from about 0.04 to 0.15, preferably about 0.07 to 0.1, measured as a solution of 0.1 percent of the polymer in dimethylformamide at 25° C.

Styrene and acrylonitrile are presently particularly preferred superstrate monomers. Although the amount of copolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100. With graft ratios above 30:100, a highly desirable degree of improvement in various properties generally is obtained.

The interpolymer systems used in this invention may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or compositions. Moreover, it may be desirable to incorporate low boiling organic, inert liquid diluents during a mass polymerization reaction to lower the viscosity, particularly when a rubber is employed. Moreover, the catalyst may be added in increments, or different catalyst may be added at the same time or at different points during the reaction. For example, when a combined mass-suspension process is employed, generally oil-soluble catalyst may be employed; and both low and high temperature catalyst may be advantageously used in some reactions.

Mechanical blends may be prepared by simple, conventional physical intermixing of preformed polymers. Conveniently, one uses starting materials in a solid, particulate form, and employs such conventional equipment as a ribbon blender, a Henschel mixer, a Waring Blendor or the like.

Graft copolymers may be prepared, for example, by polymerizing monomers of the interpolymer in the presence of the preformed rubber substrate, generally in accordance with conventional graft polymerization techniques, involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g. drum-drying, spray-drying, coagulating, etc. Preferably, they are prepared by simply blending a mixture of the interpolymer and the hydroxylated graft copolymer at an elevated temperature for a period of time sufficient to provide an intimate fusion blend of the polymers. Blends of graft copolymer and copolymer can be prepared by simply blending the two polymers together on conventional plastics working equipment, such as rubber mills, screw-extruders, etc.

A suggested above, the rubber-modified interpolymer systems used in this invention containing monovinyl aromatic compound, elastomer, and, optionally, at least one other monomer copolymerizable with such monovinyl aromatic compound. In such a system, at least about 2 weight percent of the elastomer present is graft polymerized as a substrate to (as indicated) a superstrate of monovinyl aromatic compound and (optionally and preferably) other monomer polymerizable therewith. Typically, a small amount of the superstrate interpolymer is not in chemical combination with the rubber substrate because of the less-than-100 percent grafting efficiency of conventional graft copolymerization reactions.

The above-described interpolymer systems are generally well known to the prior art and do not constitute part of the present invention. However, they are to be distinguished from prior art polymer systems such as those of styrene and rubber only with no appreciable amounts of a copolymerized monomer present (sometimes known as high impact polystyrene, as opposed to what is known, for example, as the ABS (acrylonitrile/butadiene/styrene) resins used in this invention). Thus, high impact polystyrene characteristically has a lower softening temperature, and lower tensile strength at yield than does ABS. In addition, high impact polystyrene is soluble in aliphatic hydrocarbons (such as hexane), whereas ABS only swells in such solvents. It is the superior combination of properties associated with, for example, ABS materials which is believed to contribute to making them valuable in making the unexpectedly cold-formable and heat resistant composites of the present invention.

It will be appreciated that any given matrix layer used in this invention generally comprises at least about 75 weight percent of at least one such rubber modified interpolymer system of monovinyl aromatic compound with the balance up to 100 weight percent thereof being conventional plastic processing adjuvants, organic or inorganic fillers, flame retardants, antioxidants, stabilizers, plasticizers, and the like. Besides such 75 weight percent of the interpolymer system, and assuming, of course, compatibility with no adverse effect upon the desired end composite properties of improved cold-formability and heat resistance, a given matrix layer may also contain a minor percentage, say up to about 15 or 20 weight percent or perhaps somewhat more of another polymer, such as a polyvinyl chloride, a polycarbonate, a polysulfone, a polyphenyleneoxide, a polyamide, or the like, depending upon individual wishes or circumstances, without departing from the spirit and scope of this invention. Fibrous fillers may be used.

Depending on the method of fabricating a sheet-like composite of the present invention, a matrix layer comprising such interpolymer system can be either preformed, or formed in situ around a preformed interlayer. When a matrix layer is preformed, it is conventionally made by the usual extrusion techniques conventionally employed in the plastics industry to make sheets of semi-rigid solid plastic material.

Starting material—interlayer

In general, any metal structure having the characteristics above described can be used as an interlayer in a composite of this invention, as indicated above. Such structures per se are well known to the prior art.

Honeycombs suitable for use in this invention are fabricated from paper, plastic, aluminum, steel, and other metals. The resin impregnated, kraft paper cores are the least expensive type. Aluminum, perhaps presently the most popular honeycomb metal, is generally used where maximum loads and temperatures will not be encountered by a composite of the invention. In high temperature applications, other metals, such as stainless steel and nickel, are preferred. Plastic cores are useful in composites for use at elevated temperatures and for thermal or electrical insulation.

The strength and stiffness of composites of this invention containing honeycomb interlayers are influenced by honeycomb cell shape and size, as well as by the gross thickness and mechanical properties thereof. Increasing honeycomb thickness generally results in higher section modulus and increased moment of inertia for a composite as a whole.

In a product composite, shear load orientation should be considered in relationship to the particular use to which it is desired to place a product composite. In general, shear strength and modulus tend to be anisotropic, being influenced by the cell structure of a given honeycomb interlayer; anisotropic shear property differences are particularly noticeable in hexagonal cell honeycomb structures.

In general, smaller interlayer cell size and thicker cell walls result in higher compressive strength; however, density increases. Compressive strength in a product composite can be increased by using interlayers having stronger cell walls (for example, by shifting from kraft paper to aluminum, or from 3003 aluminum to 5056 aluminum) without a weight penalty.

In the case of honeycomb interlayers fomed from kraft paper, those skilled in the art will appreciate that there are generally four grades of kraft paper used therein: 60, 80, 99, and 125 pounds per ream (3000 sq. ft.). Though untreated paper can be used to make honeycomb structures, it is much preferred to employ phenolic and polyester resin impregnated cores because of their superior strength and moisture resistance. Reinforced plastics may be used as honeycomb materials and as surface treatments for paper by honeycombs such as glass fiber reinforced plastic materials.

Plastic honeycombs are constructed of such materials as polyester film, phenolic treated with nylon, asbestos, reinforced silicones, glass fiber reinforced polyesters, phenolics, and polyimides. Presently, particularly useful interlayers are nylon and phenolic cores post treated to a predetermined density with polyester resin; such interlayer structures retain properties to temperatures of about 180° F. Glass reinforced, heat resistant phenolic cores retain properties to temperatures of about 325° F. for extended periods. Glass reinforced polyimides can be used up to about 550° F. and asbestos reinforced silicones up to about 800° F. In general, metals retain their strength characteristics to higher temperatures than do the plastics, as those skilled in the art appreciate.

It will be appreciated that while an interlayer need not be bonded to the matrix, such is a preferred condition, in general. Observe that an interlayer is substantially fully enclosed by a matrix layer which always extends between the open spaces in an interlayer in a generally continuous manner. Interlayers are preferably preformed.

Methods of fabrication

As indicated above, any convenient technique for making the composites of this invention can be employed. One method which may be used involves the step of first forming a deck of alternating sheets of preformed matrix material and of preformed interlayer such that the opposed faces of the resulting deck each comprise a different one of such matrix sheets. Thereafter, one applies to the opposed faces of the resulting deck elevated temperatures and pressures for a time sufficient to cause matrix layers to flow through open spaces in the interlayer(s), thereby to consolidate the individual members and form the desired composite.

In making a composite of this invention by laminating involving forming or laying up a deck of alternating sheets (as indicated above), it will generally be convenient to employ temperatures in the range of from about 100° C. to 250° C., pressures in the range of from about 10 p.s.i. to 1000 p.s.i. and times in the range of from about 0.1 second to 30 minutes. Pressures, temperatures and times which are greater or smaller than these specific values can, of course, be employed without departing from the spirit and scope of the invention, depending on the needs of an individual use situation. In general, the lamination conditions are such that the matrix sheets are caused to flow through open spaces in interlayers to form a desired monolithic structure in the composite with no open spaces between the former individual matrix sheet members.

Those skilled in the art will appreciate that when composites of this invention are made using preformed matrix layers and interlayers, continuous or batch processing techniques can be employed. Batch processing techniques are particularly valuable when hand operations are involved while continuous operations are particularly useful when large quantities of composites of this invention are being fabricated. It is convenient to use when forming, for example, a three-layered composite, two preformed rolls of matrix layer and one preformed layer of interlayer so positioned that the interlayer comes between the two matrix layers. As these layers continuously advance, they are laminated together between rollers which apply the necessary temperatures and pressures for appropriate times to produce composites of the invention. It will be appreciated that such temperatures and pressures must be applied for times at least sufficient to cause the initially separate but adjacent matrix layers to pass into open spaces in the interlayer and fuse together at points of contact.

Non-planar composites can be made by conventional techniques as those skilled in the art will appreciate. Interlayers can be, of course, preformed into a given spatial configuration, then preformed sheets of matrix layer material laid over opposing faces thereof and the entire assembly then brought together between opposing faces of a mating preformed pair of plates thereby to prepare a composite of this invention. For example, tubes can sometimes be made from flat sheet-like composites by thermo-forming the sheets on a form and welding the seams together, as by molding. The tubes can also be produced by continuous extrusion using a tube die and feeding in a preformed cylindrical interlayer to the die. Two dies can be used for continuous lamination or a single die can be used to effectively encapsulate a preformed interlayer. Temperatures generally above the melting point of the particular interpolymer system used are preferably employed (e.g. 125–270° C.). Sometimes roll pressures sufficient to cause fusion through overlapping faces of matrix material are valuable in forming three-dimensional shapes. Typical roll pressures range from about 40 to 400 pounds per lineal inch.

Composites containing metal honeycombs may be generally cold formed. To cold form a sheet-like composite of the present invention, one simply applies in a generally continuous manner sufficient pressure to at least one surface thereof so as to conform the starting composite to a predetermined shape, room temperatures can be employed.

Articles of manufacture made from the composites of this invention generally comprise shaped bodies formed from a sheet-like composite of the invention by applying to such composite (as indicated above) sufficient pressure in a generally continuous manner to convert the starting composite into the desired shaped body.

In general, conventional cold-forming procedures known to the art can be employed including preforming (both by shallow draw-stamping and deep-draw forming), hydro-forming, drop-forging, explosion-forming, brake-bending, compression molding, and the like.

DESCRIPTION OF THE DRAWINGS

The invention is illustrated by reference to the attached drawings wherein:

FIG. 1 is a greatly enlarged side elevational view of a composite of this invention, some parts thereof broken away, and some parts thereof shown in section; and FIG. 2 is an enlarged, schematic diagrammatic view of a process for making a composite such as shown in FIG. 1; some parts thereof broken away and some parts thereof shown in section.

Referring to FIG. 1, there is seen a composite of this invention designated in its entirety by the numeral 10. Composite 10 is seen to comprise a matrix layer 11 and an interlayer 12. The interlayer 12 here is a honeycomb; the matrix is a rubber modified interpolymer system of monovinyl aromatic compound. The matrix layer extends through open spaces in the honeycomb interlayer 12.

Referring to FIG. 2, Parts A and B, there is seen illustrated a process for making a composite of FIG. 1. Between the heated plates 14A and 14B of a press are positioned three sheets of material: A preformed sheet 16, a preformed sheet 17, and a honeycomb 15 between sheets 16 and 17. Both sheets 16 and 17 are composed of an interpolymer system of monovinyl aromatic compound and alpha-electronegatively substituted ethene compound. The assembly of sheet 16, sheet 17, and honeycomb 15 is consolidated into a continuous matrix layer 22 by heat and pressure in press 14. Sheets 16 and 17 extend through open spaces in the honeycomb 15 and fused into a continuous matrix. The completed composite 24 is seen then removed from press 14 and allowed to cool to room temperature.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples A through K

Four inch square sheets composed of rubber modified interpolymer systems of styrene are prepared by extrusion and cutting. The physical characteristics and composition of each such sheet material are given below in Table I.

TABLE I.—MATRIX SHEETS

| Example designation | thickness (mils)[1] | Tensile modulus elasticity, lbs./in. at 73° F. | Tensile strength, lbs./in.² at 73° F. | Tensile elongation, percent at 73° F. | Impact strength, ft.-lbs. falling dart[2] | Composition (numbers) refer to footnotes |
|---|---|---|---|---|---|---|
| A | 30 | 300,000 | 5,100 | 40 | 110 | (3) |
| B | 30 | 340,000 | 6,000 | 35 | 35 | (4) |
| C | 60 | 400,000 | 6,600 | 25 | 25 | (5) |
| D | 125 | 300,000 | 5,100 | 40 | 110 | (3) |
| E | 250 | 300,000 | 5,100 | 40 | 110 | (3) |
| F | 15 | 300,000 | 5,100 | 40 | 110 | (3) |
| G | 60 | 320,000 | 5,500 | 35 | 70 | (6) |
| H | 60 | 330,000 | 6,300 | 20 | 25 | (7) |
| I | 60 | 370,000 | 7,000 | 28 | 20 | (8) |
| J | 30 | 220,000 | 2,200 | 40 | 22 | (9) |
| K | 60 | 300,000 | 5,100 | 40 | 110 | (3) |

[1] 1 Mil equals 0.001 inch.
[2] Corrected to .100 inch thickness basis.
[3] A graft copolymer of 82 weight percent styrene/acrylonitrile copolymer superstrate on 18 weight percent butadiene elastomer substrate made according to teachings of U.S. Pat. 3,328,488.
[4] A graft copolymer of 88.5 weight percent styrene/acrylonitrile copolymer superstrate on 11.5 weight percent butadiene elastomer substrate made according to teachings of U.S. Pat. 3,328,488.
[5] A graft copolymer of 92.5 weight percent styrene/acrylonitrile copolymer superstrate on 7.5 weight percent butadiene elastomer substrate made according to teachings of U.S. Pat. 3,328,488.
[6] A graft copolymer of 85 weight percent styrene/acrylonitrile copolymer superstrate on 15 weight percent butadiene elastomer substrate made according to teachings of U.S. Pat. 3,328,488.
[7] A graft copolymer found by analysis to contain about 80 to 85 weight percent sytrene/acrylonitrile copolymer superstrate on about 15 to 20 weight percent polyalkyl acrylate ester elastomer substrate available commercially under the trade designation "Luran-S" from Badische Anilin and Soda Fabrik, West Germany.
[8] A graft copolymer found by analysis to contain styrene/acrylonitrile/methylmethacrylate terpolymer on a polybutadiene elastomer substrate available commercially under the trade designation "XT" from the American Cyanamid Company and preparable by the teachings of U.S. Pat. 3,354,238.
[9] A mixture of homopolystyrene and a graft copolymer of styrene polymer superstrate on a butadiene substrate containing 92½ weight percent styrene and 7½ weight percent butadiene, the graft copolymer therein having been prepared by the teachings of U.S. Pat. 3,444,270.

Examples K through N

Four inch square sheets of honeycombs are prepared. The composition and physical characteristics of each honeycomb are given below in Table II.

The product composites each display improved heat resistance, structural integrity and rigidity compared to the matrix layer alone. Each is generally lighter in weight than an all-metal panel of similar dimensions.

TABLE II.—HONEYCOMB INTERLAYERS

| Example designation | Honeycomb material | Transverse thickness (inches) | Width to height ratio of solid material portions | Geometric shape of open spaces in honeycomb | Cell size (inches) | Density (lb./ft.³) |
|---|---|---|---|---|---|---|
| L | Nomex phenolic dip | .02 | Less than 1 | Hexagonal | 3/16 | 4.0 |
| M | Glass reinforced heat-resistant phenolic | .02 | do | Rectangular | ¼ | 4.5 |
| N | 3003 alloy aluminum | 0.15 | do | Hexagonal | ⅛ | 3.1 |
| O | Nickel alloy (Inconel) | 0.15 | do | Square corrugated | ¼ | 8.2 |

Examples 1 through 10

A series of composites of this invention are each prepared as follows from the materials of respective Table I and II above by the following procedure: Two sheets of a plastic sheet material from Table I are placed together in face-to-face engagement with a single sheet of interlayer from Table II positioned inbetween. The resulting three-layered construction is placed in a press and subjected to a temperature of about 350–400° F. using a pressure of about 500 lbs./in.² for a time of about 20 minutes and thereafter is removed and allowed to cool to room temperature. Each product composite has the respective plastic sheet members bonded continuously together through the open spaces in the interlayer. Constructional details are reported below in Table III.

TABLE III.—COMPOSITES

| | Matrix layer | | Interlayer | |
|---|---|---|---|---|
| Example No. | Type (Table I) | Transverse average thickness (mils) | Type (Table II) | Percent transverse average thickness of whole composite (est.) |
| 1 | A | 100 | L | 20 |
| 2 | B | 100 | N | 15 |
| 3 | C | 100 | N | 15 |
| 4 | D | 225 | O | 6 |
| 5 | E | 480 | M | 4 |
| 6 | F | 28 | N | 53 |
| 7 | G | 100 | N | 15 |
| 8 | H | 100 | N | 15 |
| 9 | I | 100 | N | 15 |
| 10 | J | 100 | N | 15 |

Examples 11 and 12

Two samples of the composite of Example 3 are placed together in face-to-face engagement and placed in a heated press and subjected to a temperature of about 350° F., and a pressure of about 500 lbs./in.² for a time of about 10 minutes and thereafter removed and cooled to room temperature. The product is a composite having a matrix layer in which are imbedded two interlayers.

When the foregoing procedure is repeated with two samples of the composite of Example 6, similar results are obtained.

The product composites each display improved heat resistance, structural integrity and rigidity compared to the matrix layer alone. Each is generally lighter in weight than an all-metal panel of similar dimensions.

Example 13

A sheet of plastic sheet material designated A in Table I, an interlayer designated O in Table II, and a second sheet of plastc material designated J in Table I are laid up in face-to-face engagement with one another with interlayer O in between sheets A and J. The resulting three-layered construction is placed in a press and subjected to a temperature of about 350° F. and a pressure of about 500 lbs./in.² for a time of about 20 minutes, and thereafter removed and allowed to cool to room temperature. The product is a composite having a matrix layer in which is embedded a single interlayer, but in which the matrix layer is composed of two different interpolymer systems of monovinyl aromatic compound and alpha-electro-negatively substituted ethylene compound.

The product composite displays improved heat resistance, structural integrity and rigidity compared to the matrix layer alone. The product composite is generally lighter in weight than an all-metal panel of similar dimensions.

The composites of this invention are general characterized by dimensional stability and substantial freedom from stress cracking over wide environmental temperature ranges.

What is claimed is:

1. A sheet-like composite which is adapted to be cold-formed and heat resistant comprising:
   (A) a matrix layer of semi-rigid, solid plastic having spaced, generally parallel, opposed faces, said layer comprising rubber-modified interpolymer system of monovinyl aromatic compound and said layer being characterized by:
      (1) having a transverse average thickness ranging from about 0.15 to 0.5 inch,
      (2) having a tensile modulus of elasticity of from about 150,000 to 600,000 lbs./in.² at 73° F.,
      (3) having a tensile elongation to fail of at least about 5 percent at 73° F.,
      (4) having an impact strength of from about 15 to 200 ft.-lbs. falling dart (at 0.1 inch thickness and 73° F.), and
   (B) an interlayer having spaced, generally parallel, opposed faces, said interlayer comprising continuous, generally cross-sectionally elongated solid material portions arranged into a honeycomb structure, said portions having a width-to-height ratio which is less than 1, and said interlayer having a transverse average thickness ranging from about 5 to 85 percent of the total tranverse average thicgness of said matrix layer,
   (C) said interlayer being positioned substantially completely within said matrix layer and generally coextensive therewith.

2. The composite of claim 1 wherein said interlayer comprises a metal honeycomb.

3. The composite of claim 2 wherein said interlayer comprises an organic honeycomb.

4. The composite of claim 1 wherein said matrix layer comprises an interpolymer system of styrene, acrylonitrile and butadiene.

5. The composite of claim 1 wherein said matrix layer has two of said interlayers therewithin, each of said interlayers being separated one from the other by a generally uniform thickness of matrix composition.

References Cited
UNITED STATES PATENTS

| | | | |
|---|---|---|---|
| 3,043,730 | 7/1962 | Adie | 161—68X |
| 3,080,267 | 3/1963 | Schmalz | 161—190X |
| 3,257,260 | 6/1966 | Morgan | 161—69 |
| 3,317,363 | 5/1967 | Weber | 156—210 |

JOHN I. GOOLKASIAN, Primary Examiner

H. F. EPSTEIN, Assistant Examiner

U.S. Cl. X.R.

156—228